(12) United States Patent
Eldredge (10) Patent No.: US 6,792,499 B1
(45) Date of Patent: Sep. 14, 2004

(54) DYNAMIC SWAPPING OF MEMORY BANK BASE ADDRESSES

(75) Inventor: James G. Eldredge, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 274 days.

(21) Appl. No.: 10/061,914

(22) Filed: Feb. 1, 2002

Related U.S. Application Data (60) Provisional application No. 60/248,946, filed on Nov. 14, 2000.

(51) Int. Cl.[7] .............................................. G06F 12/00
(52) U.S. Cl. ......................................... 711/5; 711/202
(58) Field of Search ...................................... 711/5, 202

(56) References Cited

U.S. PATENT DOCUMENTS

| | | | |
|---|---|---|---|
| 5,619,669 A | * | 4/1997 | Katsuta .......................... 711/5 |
| 5,624,316 A | * | 4/1997 | Roskowski et al. ........... 463/45 |
| 5,802,544 A | * | 9/1998 | Combs et al. .................. 711/5 |
| 6,070,012 A | * | 5/2000 | Eitner et al. ................. 717/168 |
| 6,601,130 B1 | * | 7/2003 | Silvkoff et al. ................ 711/5 |

* cited by examiner

Primary Examiner—Kevin Verbrugge
(74) Attorney, Agent, or Firm—Marger Johnson & McCollom, PC (57) ABSTRACT

A microprocessor system is provided that includes a first memory bank having a first base address and a second memory bank having a second base address. A memory controller is adapted to register the first and second base addresses. A swap command is adapted to instruct the memory controller to swap the first and second base addresses. A microprocessor issues the swap command. The memory controller includes a first base address register adapted to register the first base address and a second base address register adapted to register the second base address. A command register is adapted to register the swap command. In one embodiment, the first memory bank is a DRAM bank and the second memory bank is a ROM bank. The swap command instructs the memory controller to swap the first and second base addresses before temporary storage is established in the DRAM bank.

20 Claims, 6 Drawing Sheets

BEFORE SWAP

FIG.8A

AFTER SWAP

DYNAMIC SWAPPING OF MEMORY BANK BASE ADDRESSES

RELATED APPLICATION DATA

This application claims priority from U.S. patent application Ser. No. 09/976,192, entitled DYNAMIC SWAPPING OF MEMORY BANK BASE ADDRESSES, filed Oct. 11, 2001, which claims priority from U.S. provisional patent application Ser. No. 60/248,946, entitled APPLICATION SPECIFIC INTEGRATED CIRCUIT, filed Nov. 14, 2000, which is incorporated herein by reference.

BACKGROUND OF THE INVENTION

1. Field of the Invention

This invention relates to microprocessor system and, more particularly, to a microprocessor system adapted to dynamically swap memory bank addresses and a method therefor.

2. Description of the Related Art

A microprocessor system includes both non-volatile, read only, memory banks, e.g., read only memory (ROM), and volatile, writable, memory banks, e.g., dynamic random access memory (DRAM). The ROM bank is typically placed at a memory map location that corresponds to the microprocessor's boot vector. That is, the microprocessor system executes from the ROM bank at boot up. In some cases, the microprocessor system requires this same memory location to be writable, e.g., when programs or interrupts are loaded dynamically, when debuggers require the program to be modifiable, or when the operating system is virtually addressed. This creates a situation during boot up where predetermined memory bank addresses are read only but must be writable immediately after boot up.

A solution to this problem is described in ARM® Limited's Reference Peripheral Specification, document number ARM DDI 0062D, issued May 1996. There, the DRAM bank is located in memory to coincide with the processor's boot vector. The ROM bank is located at an entirely separate memory location. At boot up, the ROM bank is aliased over the DRAM bank until the microprocessor can establish execution at another ROM location through jump or branch instructions. Continued boot up in the ROM bank might result in slower program execution since the ROM bank is typically slower than other forms of memory, e.g., the DRAM bank.

Accordingly, a need remains for a microprocessor system adapted to improve performance.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT(S)

Figure 1:
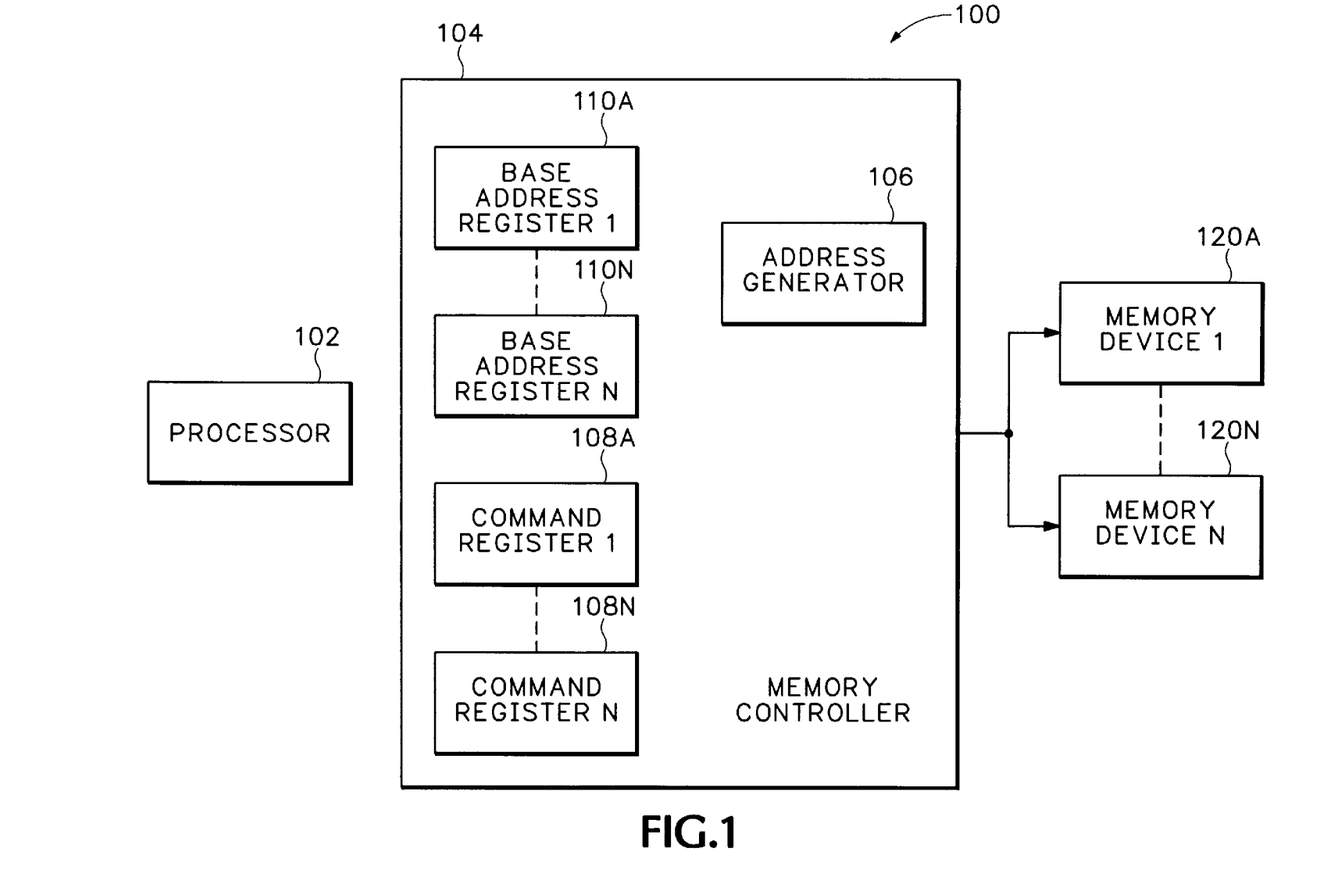
FIG. 1 is a block diagram of a microprocessor system of the present invention.

Referring to FIG. 1, a microprocessor system 100 includes a processor 102, a memory controller 104, and memory devices 120A–120N. The processor 102 accesses the memory devices 120A–120N through the memory controller 104. The processor 102 might be any of a variety of processors known to those of reasonable skill in the art. The memory devices 120A–120N might be any of a variety of memory devices known to those of reasonable skill in the art, including non-volatile, read only, memory devices, e.g., ROMs and non-volatile, writable, memory devices such as DRAMs.

The memory controller 104 includes base address registers 110A–110N corresponding to memory devices 120A–120N. The base address registers 110A–110N register or store the base address of a corresponding memory device 120A–120N. The base address registers 110A–110N might be take a variety of forms and sizes known to those of reasonable skill in the art depending on the particular application. The memory controller 104 includes an address generator 106 that generates an address corresponding to the memory devices 120A–120N. The memory controller 104 registers or stores commands issued from the microprocessor 102 in command registers 108A–108N.

The memory controller 104 interfaces directly with memory devices 120A–120N. The memory controller 104 identifies each type of memory device 120A–120N to thereby generate signaling and timing specific to the memory device 120A–120N accessed by the microprocessor 102.

Figures 2, 3:
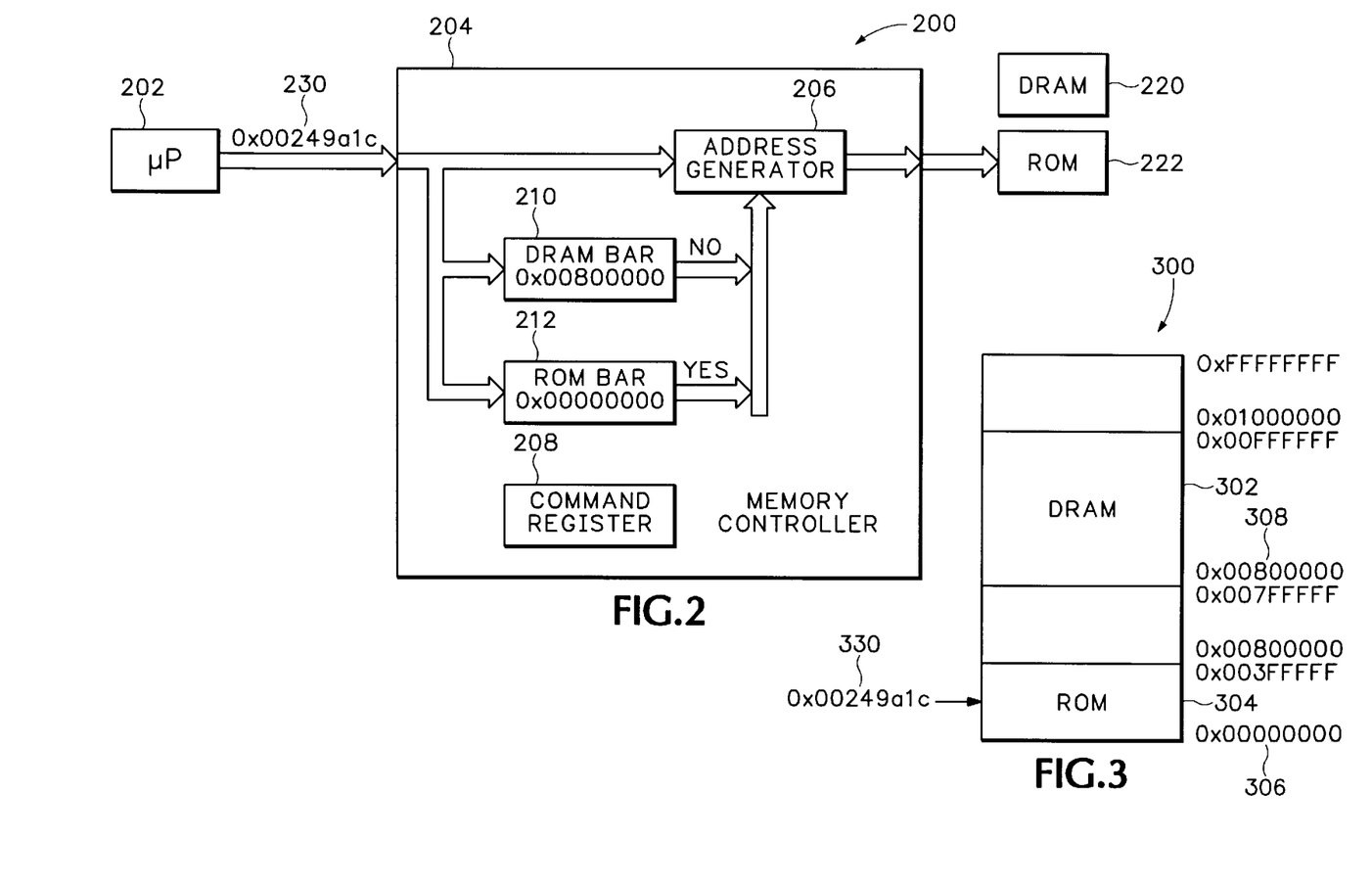
FIG. 2 is a block diagram of a memory bank access.
FIG. 3 is a diagram of a memory map.

Referring to FIGS. 1–3, the memory controller 104 maps each of the memory devices 120A–120N into a system memory map 300. The memory controller 104 maps each memory device 120A–120N by determining its size and assigning a base address, e.g., base addresses 306 and 308, to each of the memory devices 120A–120N. The memory controller 104 stores or registers the base address of the memory devices 120A–120N into a corresponding base address register 110A–110N. For example, the memory controller 104 stores the base address 306 of a ROM memory device 222 in ROM base address register 212. The memory controller maps each of the memory devices 120A–120N such that they do not overlap when their corresponding base addresses are swapped as explained in more detail below.

Referring to FIG. 2, a microprocessor system 200 includes a microprocessor 202, a memory controller 204, and memory devices 220 and 222. In the microprocessor system 200, two memory devices are shown, devices 220 and 222. It should be clear to a person of reasonable skill in the art, however, that a plurality of memory devices, each having a variety of different sizes and types, might be included in the system 200. In the example system 200, the device 220 is an 8-Megabyte DRAM memory bank and the device 222 is a 4-Megabyte ROM memory bank.

Figures 4, 5:
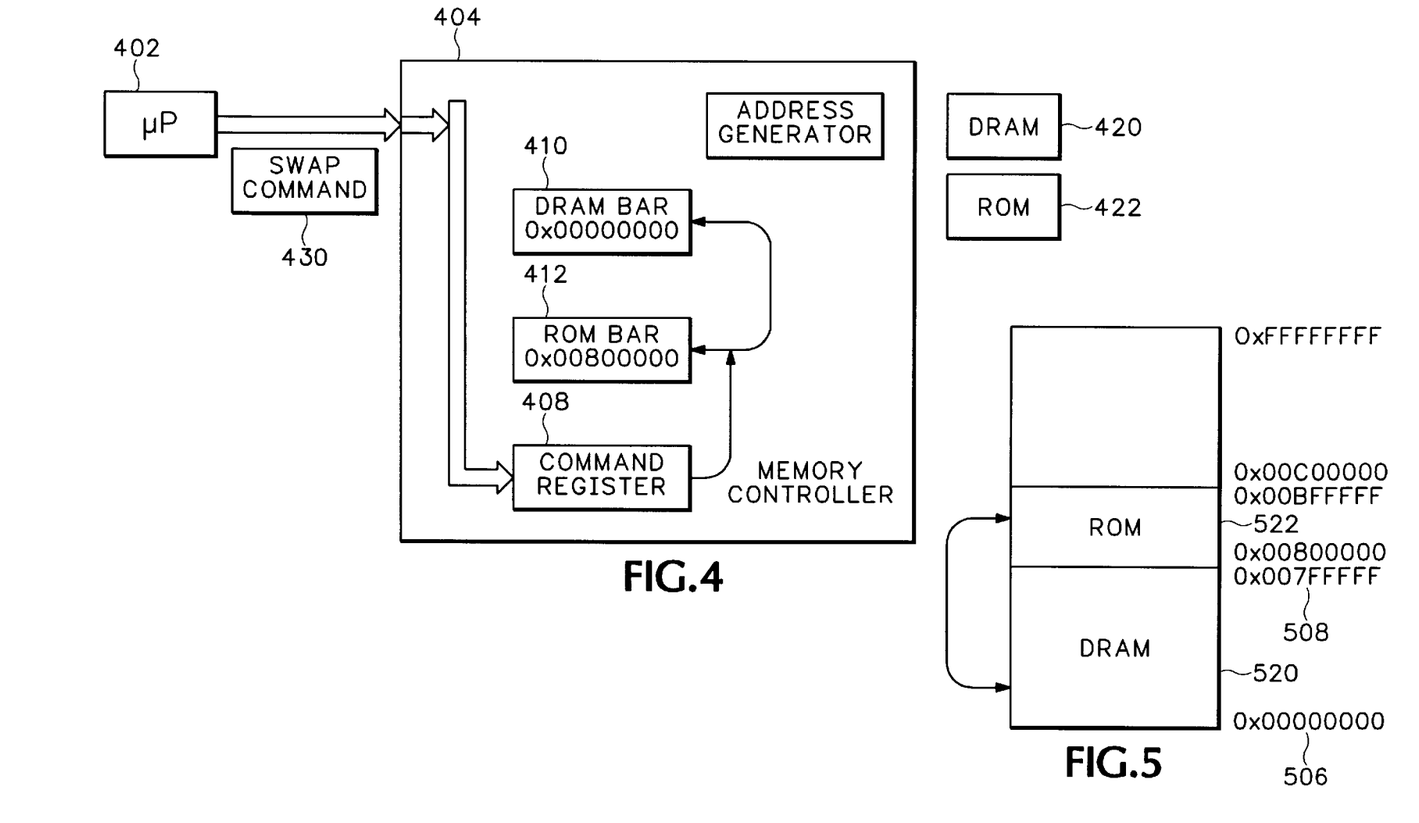
FIG. 4 is a block diagram of a memory bank address swap.
FIG. 5 is a diagram of the memory map after the memory bank address swap shown in FIG. 4.
Figures 6, 7:
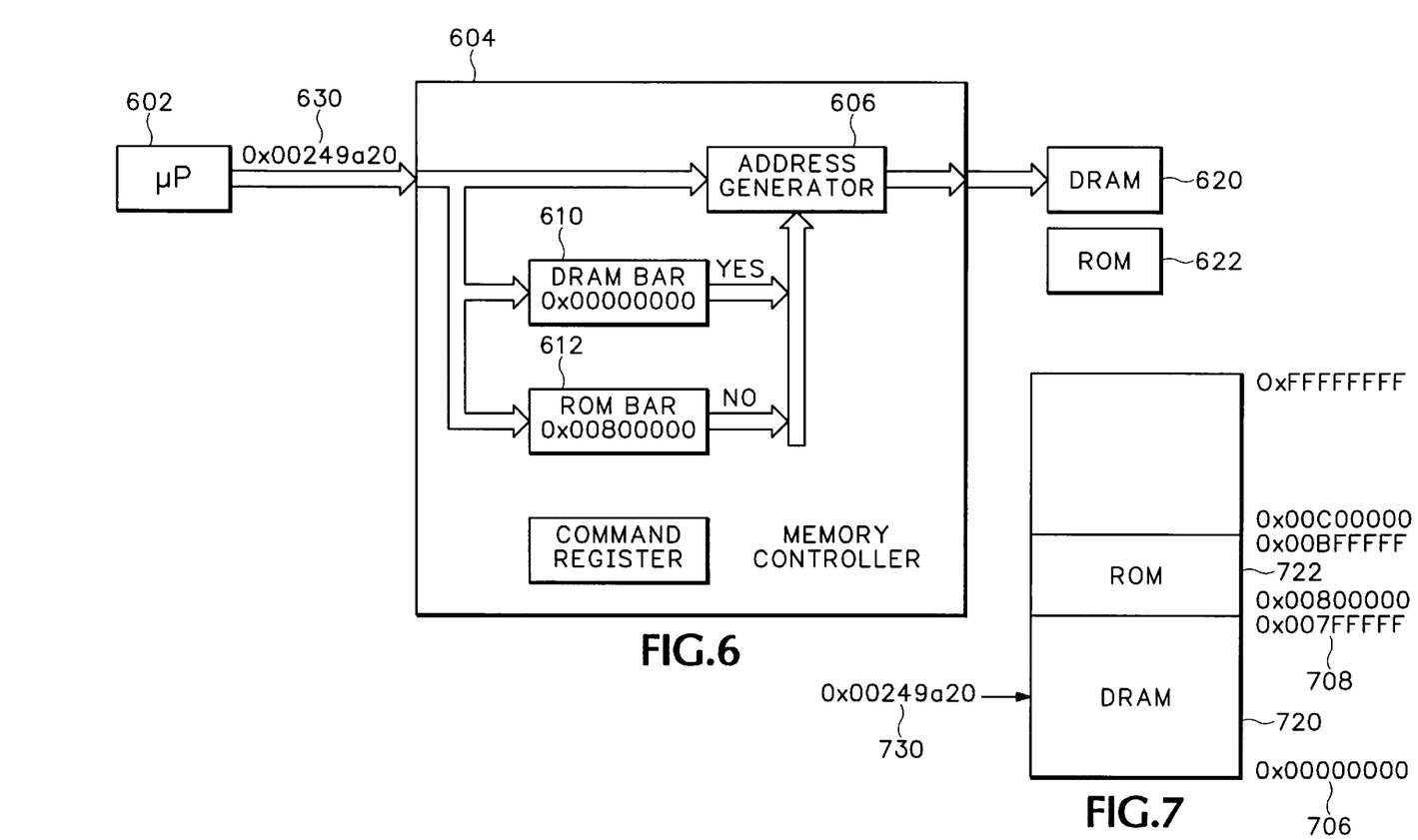
FIG. 6 is a block diagram of a memory bank access after the memory bank address swap shown in FIG. 4.
FIG. 7 is a diagram of the memory map after the memory bank address swap shown in FIG. 4.

Referring to FIGS. 2–3, at boot up, the memory controller 204 maps the memory device 222 by determining its size—4-Megabytes—and assigning a base address 306 to a corresponding base address register 212. Thus, base address 306 is stored or registered in ROM base address register 212. Likewise, the memory controller 204 maps the memory device 220 by determining its size—8-Megabytes—and assigning a base address 308 to ROM base address register 210. The base address registers are shown in FIGS. 2, 4, and 6 using the acronym BAR. In one embodiment, the memory controller assigns the ROM bank 222 a base address corresponding to the microprocessor 202 boot vector (not shown) such that when the microprocessor 202 boots up, it does so out of the ROM bank 222.

The microprocessor 202 requests a memory access by sending a request address 230 (request address 330 in FIG. 3) to the memory controller 204. The memory controller 204 compares the request address 230 (request address 330 in FIG. 3) with the base addresses 306 and 308 stored in base address registers 212 and 210, respectively. The memory controller 204 determines the request address 230 (request address 330 in FIG. 3) corresponds to the ROM bank 222. The address generator 206 generates the appropriate signaling and timing to access the ROM bank 222 as requested by the microprocessor 202.

Referring to FIGS. 3–4, the microprocessor 402 boots up its executable program (not shown separately) from the ROM bank 422 provided the ROM base address 306 (FIG. 3) corresponds to the microprocessor 402 boot vector (not shown). The microprocessor 402 copies the executable program from the ROM bank 422 to the DRAM bank 420. After the microprocessor 402 copies the executable program and before any kind of temporary storage, e.g., a stack and/or heap, is established, created, or otherwise initialized in the DRAM bank 420, the microprocessor 402 issues a swap command 430 to the memory controller 404. If temporary storage is established in the DRAM bank 420 before the swap command issues, all accesses to these data will be invalid because they will be mapped to the ROM bank 422 or unoccupied space and not to the stack or heap. The memory controller 404 writes the swap command 430 in its command register 408. Substantially simultaneously, e.g., within the same clock cycle as receiving the swap command 430, the memory controller 404 swaps the ROM base address 306 (FIG. 3) stored in base address register 412 with the DRAM base address 308 (FIG. 3) stored in base address register 410.

A person of reasonable skill in the art should recognize that the swap command 430 might indicate swapping of more than two memory devices, e.g., the memory devices 120A–120N shown in FIG. 1 where N>2. In that circumstance, a corresponding number of command registers 108A–108N (FIG. 1) is necessary. Where the system includes only two memory devices 220 and 222 as shown in FIG. 2, a single command register 208 is necessary.

Figure 8A:
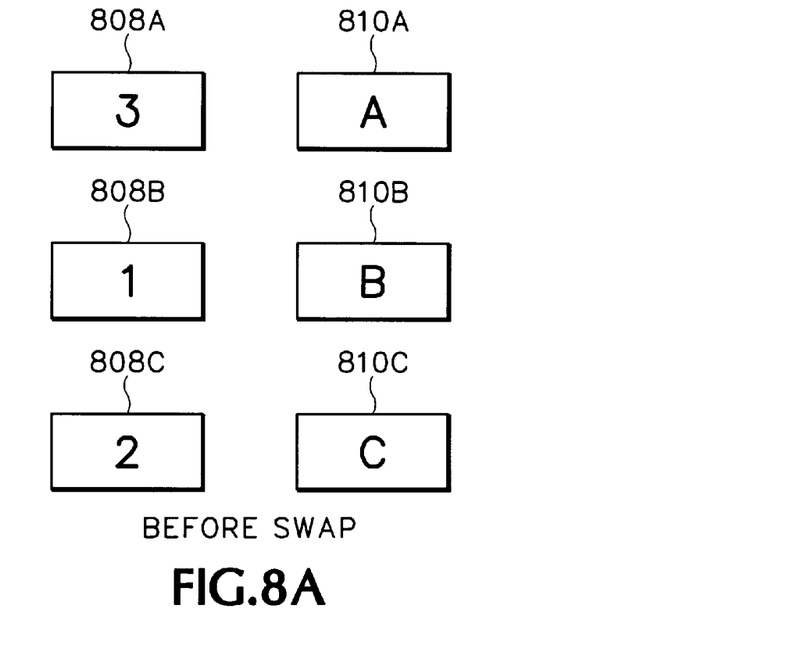
FIGS. 8A–8B is diagram mapping swap commands in corresponding command registers.
Figure 8B:
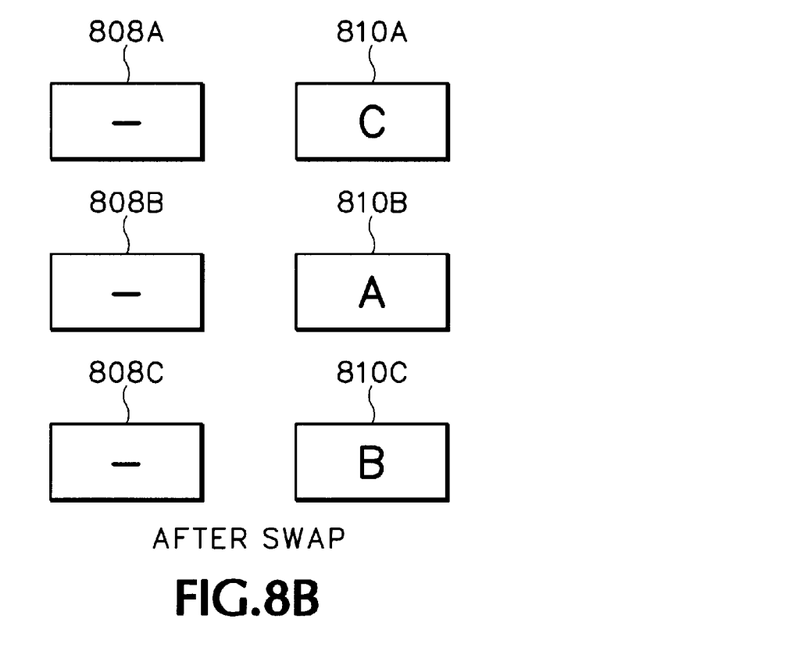

FIGS. 8A–8B shows a mapping of swap commands in command registers 808A, 808B, and 808C for swapping memory devices 820A, 820B, and 820C (not shown) whose corresponding base addresses are stored in base address registers 810A, 810B, and 810C. Referring to FIG. 8A, each command register 808A, 808B, and 808C contains separate commands for swapping different memory devices 820A, 820B, and 820C. Command register 808A stores a swap command to swap base address register 810A with 810C. Command register 808B stores a swap command to swap base address register 810B with 810A. Command register 808C stores a swap command to swap base address register 810C with 810B. The base address registers 810A, 810B, and 810C are shown after the swap in FIG. 8B.

Returning to FIG. 4, after the memory controller 404 swaps the ROM base address 306 (FIG. 3) with the DRAM base address 308 (FIG. 3), the memory map is as shown in FIG. 5. That is, the DRAM bank 520 has a base address 506 and the ROM bank 522 has a base address 508. This action relocates the entire ROM bank 522 to the DRAM bank 520 location and relocates the entire DRAM bank 520 to the ROM bank 522 location.

Referring to FIGS. 6–7, the microprocessor 602 requests a second memory access by sending a second request address 630 (address 730 in FIG. 7) to the memory controller 604. The memory controller 604 compares the second request address 630 (address 730 in FIG. 7) with the base addresses 706 and 708 (FIG. 7) stored in base address registers 610 and 612, respectively. The memory controller 604 determines the second request address 630 (address 730 in FIG. 7) corresponds to the DRAM bank 720. The address generator 606 generates the appropriate signaling and timing to access the DRAM bank 622 as requested by the microprocessor 602.

Because the DRAM bank 620 has stored therein an exact copy of the executable program contained in the ROM bank 622, the instruction fetched from the DRAM bank 620 resulting from the microprocessor's second access request is the correct successor to the instruction fetched from the ROM bank 622 resulting from the microprocessor's first access request. The microprocessor 602, therefore, seamlessly continues executing the executable program out of the DRAM bank 622 after it issues the swap command 430 (FIG. 4) since the DRAM bank 622 is now relocated to coincide with the ROM bank 620 previous location. By so doing, the microprocessor system 600 improves speed while avoiding convoluted jumps or branches necessary in prior art systems.

It should be readily apparent that one or more devices that include logic circuit might implement the present invention.

The invention additionally provides methods that are described below. The invention provides apparatus that performs or assists in performing the methods of the invention. This apparatus might be specially constructed for the required purposes or it might comprise a general-purpose computer selectively activated or reconfigured by a computer program stored in the computer. The methods and algorithms presented herein are not necessarily inherently related to any particular computer or other apparatus. In particular, various general-purpose machines might be used with programs in accordance with the teachings herein or it might prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to a method for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

A program is generally defined as a sequence of processes leading to a desired result. These processes, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they might be stored in any computer-readable medium. It is convenient at times, principally for reasons of common usage, to refer to these signals as bits, data bits, samples, values, elements, symbols, characters, images, terms, numbers, or the like. All of these and similar terms are associated with the appropriate physical quantities and these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming might use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there might be cases where modules are equivalently aggregated into a single program with unclear boundaries. In any event, the software modules or features of the present invention might be implemented by themselves, or in combination with others. Even though it is said that the program might be stored in a computer-readable medium, it should be clear to a person skilled in the art that it need not be a single memory, or even a single machine. Various portions, modules or features of it might reside in separate memories or separate machines where the memories or machines reside in the same or different geographic location. Where the memories or machines are in different geographic locations, they might be connected directly or through a network such as a local access network (LAN) or a global computer network like the Internet®.

In the present case, methods of the invention are implemented by machine operations. Put differently, embodiments of the program of the invention are made such that they perform methods of the invention that are described in this document. These might be optionally performed in conjunction with one or more human operators performing some, but not all of them. As per the above, the users need not be collocated with each other, but each only with a machine that houses a portion of the program. Alternately, some of these machines might operate automatically, without users and/or independently from each other.

Methods of the invention are now described. A person having ordinary skill in the art should recognize that the boxes described below might be implemented in different combinations, and in different order. Some methods might be used for determining a location of an object, some to determine an identity of an object, and some both.

Figure 9:
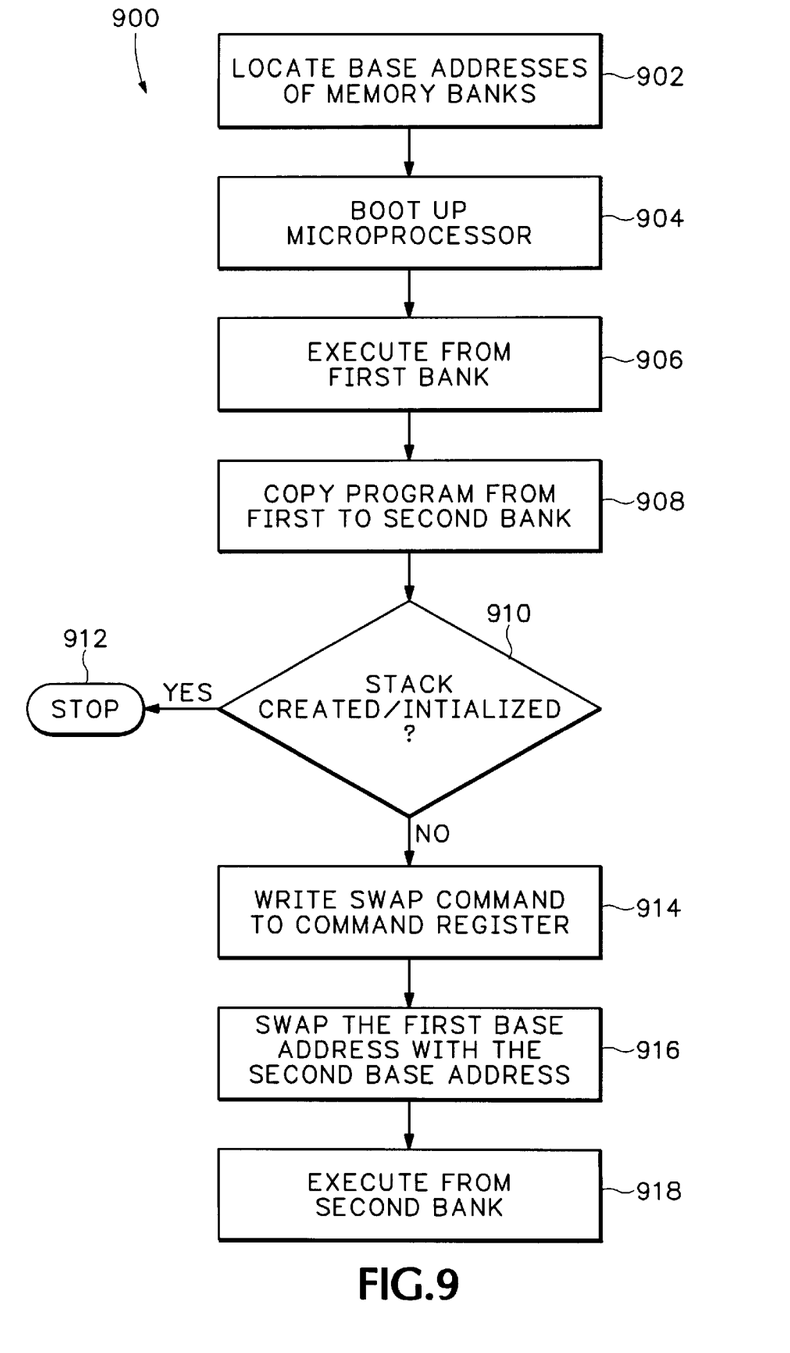
FIG. 9 is a flow diagram of a method for dynamically swapping memory bank addresses according to the present invention.

FIG. 9 is a flowchart of a method 900 for dynamically swapping the base addresses of a plurality of memory devices. At 902, the memory controller maps or locates the base addresses of each of the memory devices in corresponding base address registers. The microprocessor boots up at 904 accessing (906) its executable program from a first memory device, e.g., a ROM bank, located at the microprocessor's boot vector. At 908, the microprocessor copies the executable program from the first memory device to a second memory device, e.g., a DRAM bank. If the stack and/or heap (or other temporary storage) are established in the DRAM bank, the method stops at 912 because all accesses to these data will be invalid because they will be mapped to the ROM bank or unoccupied space and not to the stack and/or heap. If the stack and/or heap are not established, at 914, the microprocessor issues a swap command that the memory controller writes to its command register. At 916, the memory controller swaps the first base address of the first memory device with the second base address of the second memory address responsive to receiving the swap command from the microprocessor. The memory controller swaps base addresses in the same clock cycle as the microprocessor issues the swap command.

Because the second memory device, e.g., the DRAM bank has stored therein an exact copy of the executable program contained in the first memory device, e.g., the ROM bank, the next instruction fetched from the DRAM bank resulting from the next microprocessor request is the correct successor to the instruction fetched from the ROM bank responsive to the first microprocessor request. The microprocessor, therefore, seamlessly continues executing the executable program out of the DRAM bank after it issues the swap command since the DRAM bank is now relocated to coincide with the boot vector (not shown). By so doing, the microprocessor system improves speed while avoiding cumbersome jumps or branches necessary in prior art methods.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A memory controller adapted to access a plurality of memory banks responsive to a microprocessor, comprising:
   a plurality of base address registers adapted to store a plurality of base addresses corresponding to the plurality of memory banks;
   a plurality of command registers adapted to store a plurality of swap commands indicating to the controller to swap the plurality of base addresses.

2. The memory controller of claim 1 wherein the plurality of swap commands is issued by the microprocessor.

3. The memory controller of claim 1 wherein the plurality of memory banks includes:
   a DRAM memory bank; and
   a ROM memory bank.

4. The memory controller of claim 3 wherein the controller swaps the plurality of base addresses before temporary storage is initialized in the DRAM bank.

5. The memory controller of claim 1 wherein
   the plurality of swap commands is issued on a first clock cycle; and
   the controller swaps the plurality of base addresses on the first clock cycle.

6. The memory controller of claim 1 wherein the plurality of memory banks are located such that when the controller swaps the plurality of base addresses stored in the plurality of base address registers, the plurality of memory banks do not overlap.

7. A microprocessor system, comprising:

a first memory bank having a first base address;

a second memory bank having a second base address;

a memory controller to register the first and second base addresses; and a swap command register to store a swap command, the swap command instructing the memory controller to swap the first and second base addresses.

8. The microprocessor system of claim 7 including a microprocessor to issue the swap command.

9. A microprocessor system, comprising:

a first memory bank having a first base address;

a second memory bank having a second base address;

a memory controller adapted to register the first and second base addresses; and a swap command adapted to instruct the memory controller to swap the first and second base addresses;

wherein the memory controller includes:

a first base address register adapted to register the first base address;

a second base address register adapted to register the second base address;

a command register adapted to register the swap command.

10. The microprocessor system of claim 7 wherein the first memory bank is a DRAM bank; and the second memory bank is a ROM bank.

11. The microprocessor system of claim 7 wherein the first and second memory banks are located such that they do not overlap when the first and second base addresses are swapped.

12. The microprocessor system of claim 7 wherein the swap command instructs the memory controller to swap the first and second base addresses before temporary storage is established in the first memory bank.

13. A method for dynamically swapping a first with a second base address corresponding to a first and second memory banks, respectively, comprising:

locating a first base address corresponding to a first memory bank and storing it in a first base address register;

locating a second base address corresponding to a second memory bank and storing it in a second base address register;

writing swap command to a command register; and swapping the first base address with the second base address after writing the swap command.

14. The method of claim 13 including mapping the first and second memory banks such that after the first and second base addresses are swapped, the memory banks do not overlap.

15. The method of claim 13 wherein swapping the first base address occurs before creating a stack.

16. The method of claim 13 wherein swapping the first base address occurs before creating a heap.

17. The method of claim 13 including:

sending a request address;

comparing the request address with the first and second base addresses; and determining whether to access the first or second memory banks based on the comparison.

18. The method of claim 13 including:

executing a program from the first memory bank before swapping;

copying a program from the first memory bank to the second memory bank; and executing the program from the second memory bank after swapping.

19. The method of claim 13 including:

receiving a swap command from the microprocessor during a clock cycle; and swapping the first base address with the second base address responsive to the swap command on the clock cycle.

20. The method of claim 13 including booting up the microprocessor from the first memory bank.

* * * * *

UNITED STATES PATENT AND TRADEMARK OFFICE
CERTIFICATE OF CORRECTION

PATENT NO.   : 6,792,499 B1
DATED        : September 14, 2004
INVENTOR(S)  : James G. Eldredge Page 1 of 1

It is certified that error appears in the above-identified patent and that said Letters Patent is hereby corrected as shown below:

Title page,
Add Item:
-- Related U.S. Application Data
[63]   Continuation of U.S. Serial No. 09/976,192, filed October 11, 2001, now abandoned --

Column 1,
Line 3, RELATED APPLICATION DATA, should read
-- This application is a continuation and claims priority from U.S. patent application Ser. No. 09/976,192, now abndoned, entitled DYNAMIC SWAPPING OF MEMORY BANK BASE ADDRESSES, filed October 11, 2001, which claims priority from U.S. provisional patent application Ser. No. 60/248,946, entitled APPLICATION SPECIFIC INTEGRATED CIRCUIT, filed Nov. 14, 2000, which is incorporated herein by reference. --

Signed and Sealed this

Twenty-eighth Day of December, 2004

JON W. DUDAS
*Director of the United States Patent and Trademark Office*